G. W. BURKS & W. C. SUPPLER.
GUARD LOCK FOR AUTOMOBILE TIRES.
APPLICATION FILED AUG. 11, 1917.
1,279,509.
Patented Sept. 24, 1918.
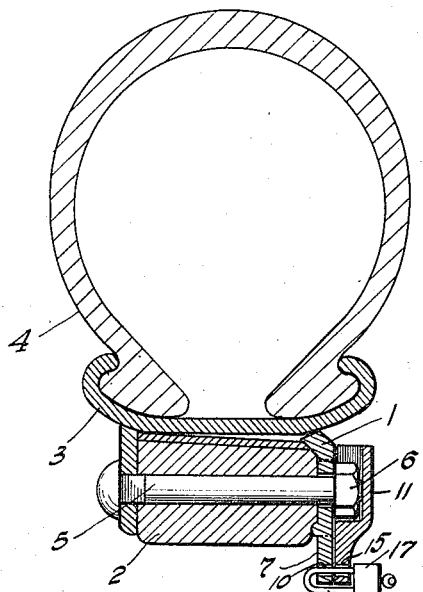
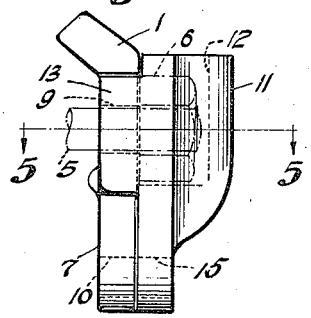
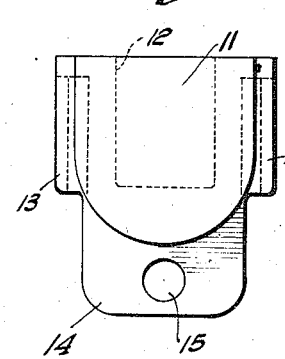
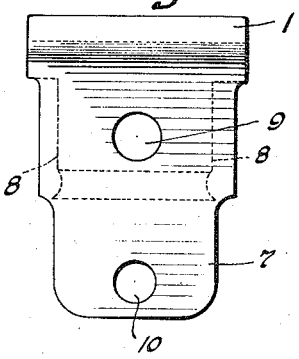
Inventors
W. C. Suppler
G. W. Burks

UNITED STATES PATENT OFFICE.

GEORGE W. BURKS AND WILLIAM C. SUPPLER, OF BIRMINGHAM, ALABAMA.

GUARD-LOCK FOR AUTOMOBILE-TIRES.

1,279,509.  Specification of Letters Patent.  Patented Sept. 24, 1918.

Application filed August 11, 1917. Serial No. 185,750.

*To all whom it may concern:*

Be it known that we, GEORGE W. BURKS and WILLIAM C. SUPPLER, citizens of the United States of America, residing at Birmingham, in the county of Jefferson and State of Alabama, have invented certain new and useful Improvements in Guard-Locks for Automobile-Tires, of which the following is a specification.

This invention relates to a key controlled guard for preventing the theft of pneumatic tires from wheels or spare rims of automobiles.

The object of our invention is to provide a simple and inexpensive device that can be locked in place over one of the nuts that serves to hold the tire in place to prevent its removal. Our device is preferably adapted to serve as a nut lock as well as a guard to prevent access to the nut to loosen it.

Our preferred arrangement is to adapt the guard to interlock with a clamp, such as is in general use, to secure a demountable rim on the wheel felly, the guard covering and holding the nut against turning on the bolt that secures the clamp to the felly. The application of our invention can be widely varied and the key controlled lock employed may be of any desired type.

As illustrative of the preferred embodiments of our invention, reference is made to the accompanying drawings, in which:—

Figure 1 shows a cross section through a wheel rim having a pneumatic tire thereon carried on a demountable rim.

Fig. 2 is an enlarged side elevation of the clamp and nut guard assembled.

Fig. 3 is a plan view of the guard.

Fig. 4 is a plan view of the clamp.

Fig. 5 is a sectional view taken on the line 5—5 of Fig. 2; and

Fig. 6 is a vertical sectional view illustrating a modified type of lock for the guard.

Similar reference numerals refer to similar parts throughout the drawings.

We have shown our invention adapted to prevent the removal of a rim clamp 1 which may be of any one of the various types such as are in general use for the purpose of securing to the felly 2 a demountable clencher rim 3 by which the pneumatic tire 4 is carried. As illustrated, the rim is held in place between clamps arranged on opposite sides of the felly and held by a bolt 5 that is passed through both clamps and the felly and has a nut 6 threaded on one end thereof. The clamp against which the nut 6 abuts is made slightly different from the ordinary clamps in that it has a base extension 7 and has its side edges undercut to form faces 8 inclined toward the felly. The body of the clamp has a hole 9 for the bolt 5 and the extension 7 has a hole 10 therein.

The guard for locking and preventing the removal of the nut 6 comprises a body portion 11 having therein a recess or seat 12 which opens through its outer end and through its inner face and is of such size as to snugly receive the nut 6, as will be seen more clearly in Figs. 5 and 6. The body is provided with undercut side flanges 13 which are adapted to interfit with the edges 8 to form a dove-tail joint with the sides of the clamp when the guard is slipped endwise over the clamp. The dove-tail joint prevents the guard moving in any direction on the clamp except lengthwise thereof. The guard has an extension 14 of reduced thickness which when in position lies flush against the clamp extension 7 and has a hole 15 adapted to register with the hole 10 in the clamp so that the staple 16 of a pad lock 17 can be passed through the two holes and the guard locked securely against relative movement on the clamp. When so applied it will be obvious that the guard is held against movement in any direction and the nut 6 cannot be turned in the recess 12 to effect the removal of the clamp 1.

In Fig. 6 the guard 11 is secured in place by a modified form of lock which as shown comprises a Yale lock barrel 18 made fast in a suitable chamber in the body portion 19 of the guard and provided with a rotary latch member 20 adapted to be turned by a key 21 to engage in a slot 22 in the extension 7 of the clamp, and when so locked the guard cannot be slipped lengthwise to disengage it from the clamp and expose the nut.

In operation, one or more of our special clamps are applied to secure the tire rim in place on the wheel or spare rim and when it is desired to lock the rim against removal the nut that secures each special clamp in place is turned to bring its side faces into parallelism with the sides of the clamp and then a guard is slipped on the clamp endwise from the hub toward the rim and caused to interlock with a dove-tail joint with side edges of the clamp and to receive the nut in its guard recess 12, after which each guard is locked in place and the tire and rim cannot thereafter be removed until the several guards are unlocked.

It is within the contemplation of our invention that our improved type of nut lock and guard may be modified for application to any nut or equivalent fastening which may be relied upon to hold the tire to the rim or felly as the case may be, and that the construction of our guard may be widely varied without departing from the spirit of our invention.

Having thus described our invention, what we claim as new and desire to secure by Letters Patent, is:—

1. The combination of a member secured by a nut and bolt and having side flanges, of a nut guard recessed to house the nut and having its sides shaped to slide into interlocked relationship with said flanges when it prevents the nut turning, and a key controlled lock to fasten the said member and guard in interlocked relationship.

2. In a mechanism for preventing the unauthorized removal of demountable wheel rims, the combination of a demountable rim clamp having undercut side edges, a nut guard having side flanges adapted to slidably interlock with the clamp's undercut edges, and key controlled means to positively lock the guard and clamp in interlocked relationship.

3. In a mechanism for preventing the unauthorized removal of demountable wheel rims, the combination of a demountable rim clamp having undercut side flanges and an inner locking extension, a nut guard adapted to interlock with a dove-tail joint with said clamp flanges and to overlap said inner extension, said guard and clamp extension having co-acting key controlled locking means to hold said members when interlocked against relative movement.

4. A nut guard having a metallic body recessed in its inner face to house a nut and having undercut side flanges, and a key controlled lock carried by said guard and adapted to engage as a keeper a member interlocked with said flanges.

5. In a guard for rim clamp nuts, a body having in one face a countersunk recess which opens through an end wall and is adapted to fit over and house a nut to prevent access to the nut to loosen it, and key controlled means adapted to engage and lock the guard to a rim clamp with its recessed face in fixed position over the nut that secures said clamp.

6. In combination, a demountable rim clamp having undercut side edges and an elongated end extension toward the wheel hub, a nut guard having a wide body provided with offset flanges adapted to be slid into interlocking relation with said undercut edges of the clamp and having an end portion which overlies said end extension of the clamp, and a key controlled lock engaging the lug extension and guard to fasten them in interlocked relationship.

7. As an article of manufacture, a demountable rim clamp comprising a felly engaging body with a bolt hole therein and side undercut edges, one end of the clamp being adapted to engage a tire rim and the other end being slotted to receive a lock bolt.

8. As an article of manufacture, a demountable rim clamp comprising a felly engaging body having a central bolt hole and parallel undercut side edges, a rim engaging lip at one end of the clamp and an extension at the opposite end of the clamp beyond its undercut side edges, said extension carrying means to coöperate with a lock upon an element in dove-tail engagement with said clamp's undercut side edges.

In testimony whereof we affix our signatures.

GEORGE W. BURKS.
WILLIAM C. SUPPLER.

Witness:
NOMIE WELSH.